(12) United States Patent
Tay et al.

(10) Patent No.: US 10,233,901 B2
(45) Date of Patent: Mar. 19, 2019

(54) TURBINE FOR CAPTURING ENERGY FROM A FLUID FLOW

(75) Inventors: Bob Tay, Singleton Park (GB); Anthony Fenwick-Wilson, Singleton Park (GB); Mark Cross, Singleton Park (GB); Nick Croft, Singleton Park (GB); Sam Rolland, Singleton Park (GB); Alison Williams, Singleton Park (GB)

(73) Assignee: CROSS-FLOW ENERGY COMPANY LIMITED, Swansea (GB)

( * ) Notice: Subject to any disclaimer, the term of this patent is extended or adjusted under 35 U.S.C. 154(b) by 1087 days.

(21) Appl. No.: 13/512,586

(22) PCT Filed: Aug. 9, 2010

(86) PCT No.: PCT/GB2010/051313
§ 371 (c)(1),
(2), (4) Date: Oct. 4, 2012

(87) PCT Pub. No.: WO2011/018651
PCT Pub. Date: Feb. 17, 2011

(65) Prior Publication Data
US 2013/0017063 A1 Jan. 17, 2013

(30) Foreign Application Priority Data

Aug. 10, 2009 (GB) .................................. 0913877.7
Nov. 30, 2009 (GB) .................................. 0920929.7

(51) Int. Cl.
*F03D 3/04* (2006.01)
*F03B 17/06* (2006.01)

(52) U.S. Cl.
CPC .............. *F03D 3/04* (2013.01); *F03B 17/062* (2013.01); *F03D 3/0409* (2013.01);
(Continued)

(58) Field of Classification Search
CPC ........ F03D 3/04; F03D 3/0409; F03D 3/0427; F03D 3/0436; F03D 3/0454;
(Continued)

(56) References Cited

U.S. PATENT DOCUMENTS 1,096,057 A * 5/1914 Rees ..................... F03D 3/0472
415/2.1
1,300,499 A * 4/1919 Slagel ..................... B64C 11/00
415/2.1
(Continued)

FOREIGN PATENT DOCUMENTS

CN 1675467 A 9/2005
DE 2451751 A1 5/1976
(Continued)

OTHER PUBLICATIONS

International Search Report, corresponding to PCT/GB2010/051313, dated Apr. 13, 2011, 4 pages.
(Continued)

*Primary Examiner* — Ninh H. Nguyen
*Assistant Examiner* — Wayne A Lambert
(74) *Attorney, Agent, or Firm* — Lewis Roca Rothgerber Christie LLP

(57) ABSTRACT

A wind turbine for capturing energy from a fluid flow comprises a rotor having a rotational axis and a plurality of rotor blades 104 arranged for rotation about the rotational axis. The rotor blades extend longitudinally in a direction substantially parallel to the rotational axis. A shield member V3 is arranged to shield some of the rotor blades from an oncoming wind where incidence of the wind on those rotor blades would act against rotation of the rotor in the direction of rotation. The rotor blades 104 are distributed about the circumference of the rotor and are spaced from the rotational axis, defining a substantially cylindrical space within the (Continued)

rotor through which the wind passes. The shield member V3 is defined by a radially inward surface and a radially outward surface. The radially inward surface follows substantially a portion of the circumference of the rotor. The radially outward surface of the shield member V3 comprises a first portion which meets the radially inward surface. In the region of the interface with the radially inward surface, the first portion extends in a first direction n that makes an angle of at least 0 degrees and up to 90 degrees in the contra-rotational direction with the radial direction of the rotor. The radially outward surface of the shield member V3 comprises a second portion which meets the first portion. At least a portion of the second portion extends in a second direction p that makes an angle of more than 0 degrees in the contra-rotational direction with the first direction n. The turbine has improved power output and efficiency compared to earlier similar designs.

11 Claims, 5 Drawing Sheets

(52) U.S. Cl.
CPC ........ *F03D 3/0454* (2013.01); *F05B 2210/16* (2013.01); *F05B 2240/13* (2013.01); *F05B 2250/70* (2013.01); *F05B 2250/71* (2013.01); *Y02E 10/28* (2013.01); *Y02E 10/74* (2013.01)

(58) Field of Classification Search
CPC ...... F03D 3/0463; F03D 3/0481; F03D 3/049; F03D 3/062; F03B 17/062; F03B 17/063; F05B 2210/16; F05B 2240/12; F05B 2240/13; F05B 2250/70; F05B 2250/71; Y02E 10/226; Y02E 10/74
See application file for complete search history.

(56) References Cited

U.S. PATENT DOCUMENTS

| | | | | |
|---|---|---|---|---|
| 1,460,114 | A * | 6/1923 | Shelton | F03D 3/0472 415/4.2 |
| 1,463,924 | A * | 8/1923 | Yukiteru | F03D 3/049 415/208.2 |
| 1,808,874 | A * | 6/1931 | Wilson | F03D 3/0472 415/4.4 |
| 2,169,149 | A * | 8/1939 | Johanson | F03D 3/049 415/4.2 |
| 3,883,261 | A * | 5/1975 | Saxmann | F03D 3/0463 415/202 |
| 3,895,882 | A * | 7/1975 | Moyer | F03D 3/0472 415/4.4 |
| 3,938,907 | A * | 2/1976 | Magoveny | F03D 3/0409 415/141 |
| 3,970,409 | A * | 7/1976 | Luchuk | F03D 7/06 415/4.3 |
| 4,031,405 | A * | 6/1977 | Asperger | F03D 3/0472 290/44 |
| 4,084,918 | A * | 4/1978 | Pavlecka | F03D 1/04 290/55 |
| 4,278,896 | A * | 7/1981 | McFarland | F03D 3/02 290/44 |
| 4,279,569 | A * | 7/1981 | Harloff | F01D 1/14 415/148 |
| 4,288,200 | A * | 9/1981 | O'Hare | F03D 3/0481 415/4.4 |
| 4,295,783 | A * | 10/1981 | Lebost | F03B 13/145 290/54 |
| 4,350,900 | A * | 9/1982 | Baughman | F03D 3/049 290/44 |
| 4,872,804 | A * | 10/1989 | Teles De Menezes | F03D 3/0454 415/2.1 |
| 5,083,899 | A * | 1/1992 | Koch | F03D 3/0481 415/2.1 |
| 5,332,354 | A * | 7/1994 | Lamont | F03D 3/0463 415/2.1 |
| 5,375,968 | A * | 12/1994 | Kollitz | F03D 3/0409 415/2.1 |
| 5,380,149 | A * | 1/1995 | Valsamidis | F03D 3/0409 415/2.1 |
| 5,969,430 | A * | 10/1999 | Forrey | F03D 3/0463 290/44 |
| 6,109,863 | A * | 8/2000 | Milliken | F03B 17/065 415/1 |
| 6,158,953 | A * | 12/2000 | Lamont | B64C 11/007 415/125 |
| 6,465,899 | B2 * | 10/2002 | Roberts | F03D 3/0409 290/44 |
| 6,849,964 | B2 * | 2/2005 | Becherucci | F03D 3/0418 290/42 |
| 6,955,521 | B2 * | 10/2005 | Yang | F03D 3/0445 290/44 |
| 6,981,839 | B2 * | 1/2006 | Fan | F03D 3/002 290/55 |
| 6,984,899 | B1 * | 1/2006 | Rice | F03D 3/049 290/44 |
| 7,329,965 | B2 * | 2/2008 | Roberts | F03D 3/02 290/44 |
| 7,880,322 | B2 * | 2/2011 | Cumings | F03D 3/0472 290/54 |
| 2003/0133782 | A1 | 7/2003 | Holter et al. | |
| 2007/0018462 | A1 * | 1/2007 | Richards | F03D 3/002 290/55 |
| 2007/0269305 | A1 * | 11/2007 | Burg | F03B 17/063 415/4.2 |
| 2009/0045632 | A1 * | 2/2009 | Krauss | F03D 3/0409 290/54 |
| 2009/0081020 | A1 * | 3/2009 | Caldwell | F03D 3/002 415/4.1 |
| 2010/0215488 | A1 * | 8/2010 | Santoro | F03D 3/0454 415/208.1 |
| 2011/0318161 | A1 * | 12/2011 | Miljkovic | F03D 3/02 415/1 |
| 2012/0171011 | A1 * | 7/2012 | Iwanow | F03D 3/0418 415/4.2 |
| 2013/0170949 | A1 * | 7/2013 | Samuels | F03D 9/007 415/1 |

FOREIGN PATENT DOCUMENTS

| | | |
|---|---|---|
| JP | 2004-11598 A | 1/2004 |
| WO | WO 2004/018872 A2 | 3/2004 |
| WO | WO 2006/039727 A1 | 4/2006 |

OTHER PUBLICATIONS

UK Search Report dated Jan. 19, 2010 in priority Application No. GB 0920929.7 (1 page).
SIPO Office action dated Jun. 4, 2014 in corresponding Application No. CN 201080054243.3 (6 pages).

* cited by examiner

TURBINE FOR CAPTURING ENERGY FROM A FLUID FLOW

CROSS-REFERENCE TO RELATED APPLICATION(S)

This application is a National Phase Patent Application and claims priority to and benefit of International Application Number PCT/GB2010/051313, filed on Aug. 9, 2010, which claims priority to and benefit of British Patent Application Number 0920929.7, filed on Nov. 30, 2009, the entire disclosure of which are incorporated herein by reference.

FIELD OF THE INVENTION

The present invention relates to a turbine for capturing energy from a fluid flow, in particular a wind turbine. However, the invention is also of application to water-powered turbines.

BACKGROUND OF THE INVENTION

The energy in flowing fluids such as from wind, flowing rivers and from tides is a source of energy for generating, for example, electricity without producing polluting emissions such as carbon dioxide. At present there is a need for devices that can generate electrical energy from wind or other fluid flows efficiently and economically. Even the extant commercial and industrial devices have an inordinate payback period that makes them very difficult to justify on a purely economic and commercial basis.

There are two major types of wind turbines:
the horizontal axis wind turbine (HAWT) where the wind blows along the axis of rotation, through the 'disk' formed by the rotating blades; and
the vertical axis wind turbine (VAWT) where the wind is perpendicular to the axis of rotation.

The HAWT is a propeller design, with long blades attached at one end to a rotating hub. Once rotating, the apparent wind direction affecting each blade varies along the length of the blade, which is twisted in order to achieve optimum performance. It now seems accepted that only the outer one third of the length of the blade generates appreciable power. Larger sizes of HAWTS create major engineering and installation problems and they are noisy.

The VAWT is exemplified by the Darrieus design first described by Georges Jean Marie Darrieus in U.S. Pat. No. 1,835,018. The turbine has an axle that rotates about an axis that extends perpendicularly to the wind direction. The turbine has a plurality of blades, which are mechanically connected to the axle. The blades have a streamline section, which extends along an axis that is a tangent to a circle concentric with the axle. Wind blowing across the turbine, generates a transverse thrust and thus rotation of the axle.

Recent designs of VAWTs by Turby B. V of Lochem, The Netherlands and XCO2/Quiet Revolution (UK Patent Application No. GB-A-2404227) have three blades which rotate about a longitudinal axis in which the upper end and the lower end of the blades are offset from each other horizontally so that each blade has a helix-like form. Other designs for vertical axis wind turbines are disclosed in JP 2008-025518, WO 2008/039727, WO 02/095221, DE 24 44 803, DE 24 51 751, US 2003/0209911 and WO 2008/095389. Other wind turbine designs are disclosed in U.S. Pat. No. 5,332,384 and US 2003/0133782.

SUMMARY OF THE INVENTION

The present invention provides a turbine for capturing energy from a fluid flow, in particular a wind turbine, according to claim 1.

A turbine having the configuration defined above has been found to have superior power output and efficiency when compared to prior designs. In particular, many prior designs rely on the Venturi effect to funnel airflow through the turbine. The design according to the invention, at least in the presently preferred embodiments, creates a region of high pressure in the region of the shielding member which accelerates fluid into and through the device. The open centre of the turbine allows each rotor blade to interact with the fluid twice: once as the fluid enters the rotor and once as the fluid exits this rotor. This allows the turbine to extract the maximum energy from the fluid.

The radially inward surface of the shield member follows a portion of the circumference of the rotor. However, it is not necessary, although possible for the radially inward surface of the shield member to follow the circumference of the rotor along the entire length of the radially inward surface. Thus the radially inward surface may diverge from the circumferential direction of the rotor, for example in the leeward direction of the radially inward surface.

The angle between the first direction and the radial direction of the rotor may be greater than 0 degrees, desirably greater than 16 degrees, preferably greater than 30 degrees, more preferably greater than 46 degrees, yet more preferably greater than 60 degrees. The angle between the first direction and the radial direction of the rotor may be less then 90 degrees, preferably less than 85 degrees, more preferably less than 80 degrees. A preferred range for the angle between the first direction and the radial direction of the rotor is between 60 degrees and 80 degrees.

The angle between the first direction and the second direction may be greater then 40 degrees, preferably greater than 60 degrees. A preferred range for the angle between the first direction and the second direction is between 60 degrees and 100 degrees. The second portion can be considered to extends in a second direction that makes a (maximum) angle of more than 180 degrees in the contra-rotational direction with the reverse of the first direction.

The radially outward surface of the shield member comprises a third portion which meets the second portion. At least a portion of the third portion extends in a third direction that makes an angle of more than 0 degrees in the rotational direction with the second direction. Thus, at least a portion of the third portion may extend in a third direction that makes an angle of less than 180 degrees in the contra-rotational direction with the reverse of the second direction. The angle between the second direction and the third direction may be less than 90 degrees, preferably less than 60 degrees. The angle between the second direction and the third direction may be greater than 30 degrees. A preferred range for the angle between the second direction and the third direction is between 30 degrees and 60 degrees. In certain embodiments, where the third portion is particularly short, the angle between the second portion and the third portion may be greater than 90 degrees.

Where the radially outward surface of the shield member is curved, the first direction and/or the second direction and/or the third direction may be determined by reference to the tangent to the relevant portion of the curved surface. Thus, in accordance with the invention, the curved surfaces are selected to each have at least one tangent that meets the requirements for the relevant direction.

The third portion may have a length greater than half the radius of the rotor and less than three times the radius of the rotor. Preferably the third portion has a length greater than 70% of the radius of the rotor, more preferably the third portion has a length greater than the radius of the rotor. Preferably the third portion has a length less than twice the radius of the rotor. The third portion may have a length less than the radius of the rotor. In determining an appropriate length for the third (tail) portion, there is a trade off between the power output of the turbine and the stability and manufacturability of the overall device.

The rotor blades may be arcuate in cross-section. In this sense, arcuate does not imply that the rotor blades are formed by an arc of a circle, although this is possible, merely that the rotor blades are curved in some way. A curved blade design with a concave trailing surface is effective in "catching" fluid flow. Similarly, a convex leading surface of the rotor blade can guide fluid flow through the turbine.

The blades may be tilted with respect to the radial direction of the rotor. Thus, a chord line between the ends of the arcuate cross-section of the blades may make an angle of more than 0 degrees and less than 45 degrees in the contra-rotational direction with the outward radial direction of the rotor. The use of the term 'chord line' is not intended to imply that the blades are formed by an arc of a circle, although this is possible. The angle of the chord line to the radial direction of the rotor may be greater than 5 degrees, preferably greater than 10 degrees. The angle of the chord line to the radial direction of the rotor may be less than 40 degrees, desirably less than 35 degrees, preferably less than 30 degrees, more preferably less than 25 degrees, yet more preferably leas than 20 degrees.

It is not necessary for all of the rotor blades to be identical in size, position or orientation, although this simplifies design and manufacture of the turbine. In certain embodiments of the invention, the rotor blades may have a helical configuration. Thus, the blades may extend longitudinally not only in a direction parallel to the axis of rotation of the turbine, but also in a direction which is tangential to the axis of rotation, whereby to define a helix.

Typically, the turbine may comprise more than five rotor blades and fewer than 19 rotor blades. Desirably, the turbine may comprise more than seven rotor blades. Desirably, the turbine may comprise fewer than 17 rotor blades, preferably fewer than 15 rotor blades and more preferably fewer than 13 rotor blades, yet more preferably fewer than eleven rotor blades, most preferably fewer than nine rotor blades. A presently preferred turbine design for a full-size production prototype comprises eight rotor blades.

The extent of the rotor blades in the radial direction of the rotor may be greater than 10% of the radius of the rotor and less than 50% of the radius of the rotor. Desirably, the extent of the rotor blades in the radial direction of the rotor may be greater than 15%, preferably greater than 20%, more preferably greater than 25% of the radius of the rotor. Desirably, the extent of the rotor blades in the radial direction of the rotor may be less than 46%, preferably less than 40% of the radius of the rotor.

The turbine may comprise a flow-directing member within the substantially cylindrical space. The flow-directing member may have a radially outward surface which follows substantially a portion of the circumference of the substantially cylindrical space. The flow-directing member may have a radially inward surface that substantially mirrors the radially outward surface.

The turbine may be configured such that the radius of the rotor bounding the shield member makes an angle ("the wind angle") of at least zero degrees and up to 45 degrees with the direction of fluid flow incident on the turbine rotor. The wind angle may be greater than 0 degrees, preferably greater than 5 degrees, more preferably greater than 10 degrees. The wind angle may be less than 45 degrees, preferably leas than 35 degrees, more preferably less than 25 degrees. A preferred range for the wind angle is between 10 degrees and 25 degrees.

BRIEF DESCRIPTION OF THE DRAWINGS

Embodiments of the invention will now be described in more detail by way of example only and with reference to the accompanying drawings, in which:

FIG. 2b is a cross-section of an alternative embodiment of a portion of the device of FIG. 2a;

DETAILED DESCRIPTION OF THE PREFERRED EMBODIMENT

Figure 1:
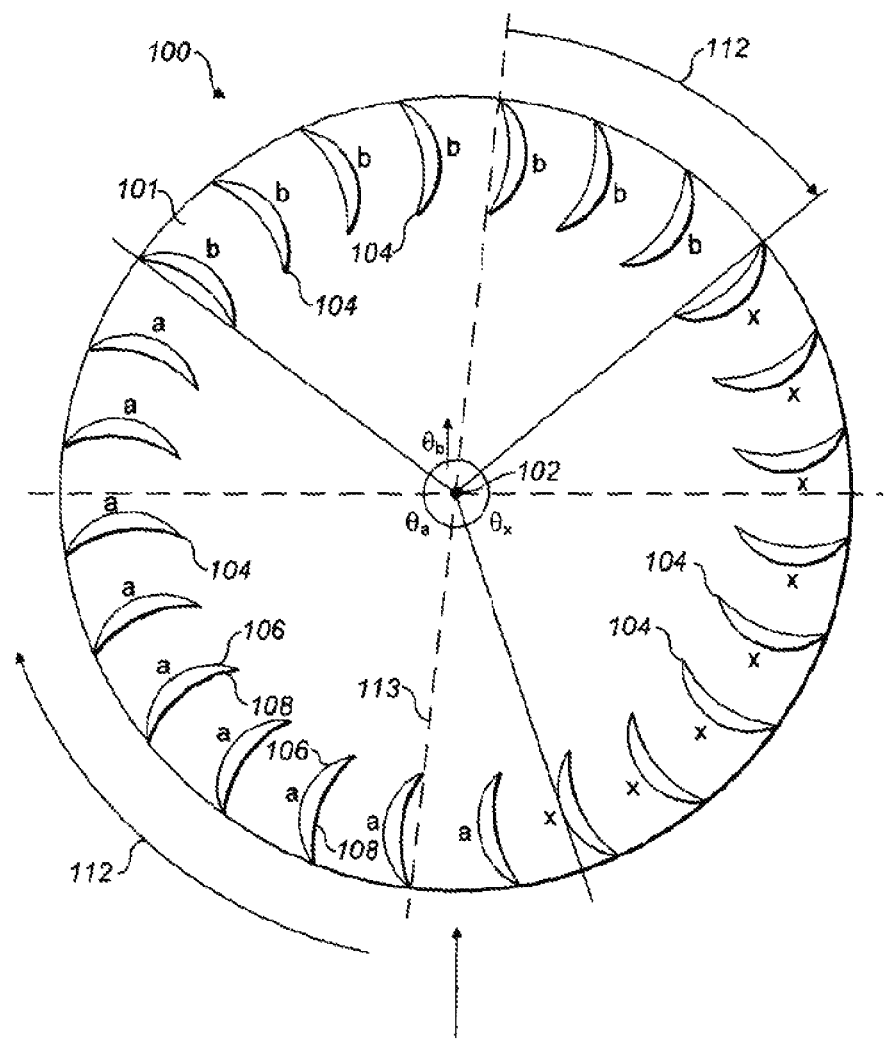
FIG. 1 is a plan view of a device to explain the present invention.

A device 100 for translating fluid flow into rotary motion, in the form of a wind turbine, is shown in FIG. 1. The driving blades extend along the axis of rotation and the axis of rotation projects vertically from the ground. Thus, the device can be described as a vertical axis wind turbine. The direction of the fluid flow and the axis of rotation of the device of FIG. 1 are perpendicular to one another. The device can take the form of a simple arrangement with one rotating component, which converts kinetic energy from the wind into torque in a rotating shaft.

As shown in FIG. 1, the device 100 comprises a rotor formed of an axle 102 to which a plurality of blades 104 are connected and around which they are located. The blades 104 are connected to the axle 102 by a disc 101. The disc 101 is centred on and connected to the axle 102. In cross-section, the blades 104 are arcuate with a convex leading surface and a concave trailing surface. The blades 104 are equally spaced radially from the axle 102 and the blades 104 are equally spaced circumferentially from one another. The longitudinal axes of the blades 104 extend substantially parallel to the axle 102. The blades 104 are all identical and straight. The blades could also be helical, that is twist around the axis of rotation as they extend along it. The blades could also extend towards the axis of rotation as they extend along the axis.

The rotating axle 102 can be connected to a dynamo or other electricity generating device in order to generate electricity from the fluid flow. Alternatively, it could be used as a motive force or in a combination of motive force and electricity generation.

Figure 2A:
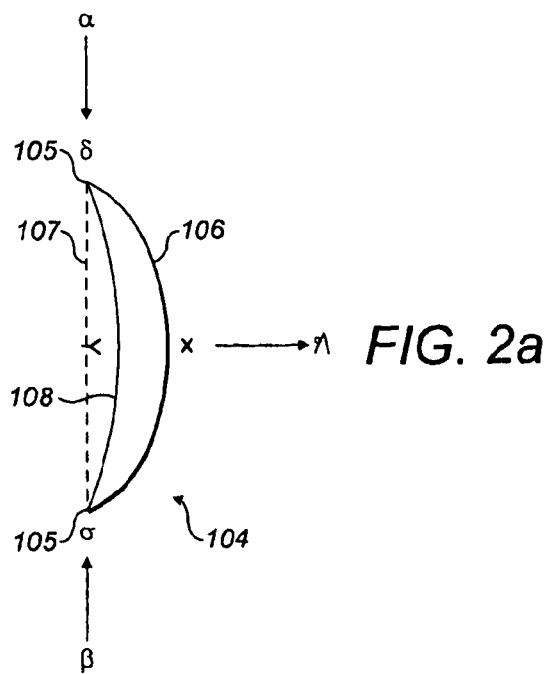
FIG. 2a is a cross-section of a portion of the device of FIG. 1.

The shape of the cross-section of the blades 104 is shown in FIG. 2a. The blades 104 have a curved (arcuate) profile, which tapers to a point at each end or edge 105. From end to end, the surface of the upper (leading) side or camber 106 is longer than the lower (trailing) side or camber 108. Thus, each blade 104 has an aerofoil-shape cross section. In this embodiment, the blades 104 are symmetrical about an perpendicular to a chord line 107. The chord line 107 or axis is a straight line extending or defined between the ends 105 of the blade 104. The blades 104 can be located such that the chord line or axis of the chord 107 of each blade passes through the axis of rotation of the device 100 (line 113 in FIG. 1), but this is not preferred.

Figure 2B:
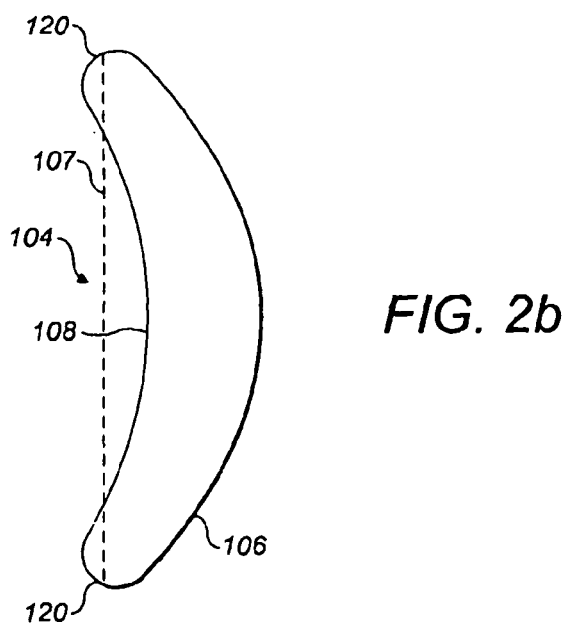

An alternative blade cross-section is shown in FIG. 2b and like features have been given like reference numerals. Rather than the ends of each blade 104 forming a point, the ends 120 are filleted.

In the example of FIG. 1, the orientation of the blades is such that the device is made to rotate in a clockwise direction shown by arrows 112. Because of their orientation, not all the blades 104 drive the device 100 in the desired direction. In the example of FIG. 1, the blades marked "x" create resistance and create a vectored force which drives the disc in the opposite (anti-clockwise) direction. In very general terms, the blades marked "a" create a vectored force, which drives the device in the clockwise direction as do the blades marked "b". The blades "x" which create resistance and drive the device anti-clockwise are located at an angle $\theta_x$, between 145° and 255°. The blades "a", which drive the device clockwise, are located at an angle $\theta_a$, between 255° and 35°. The blades b, which also drive the device clockwise, are located at an angle $\theta_b$ between 35° and 145°. Thus, blades spanning 250° drive the device in a clockwise direction.

Figure 3:
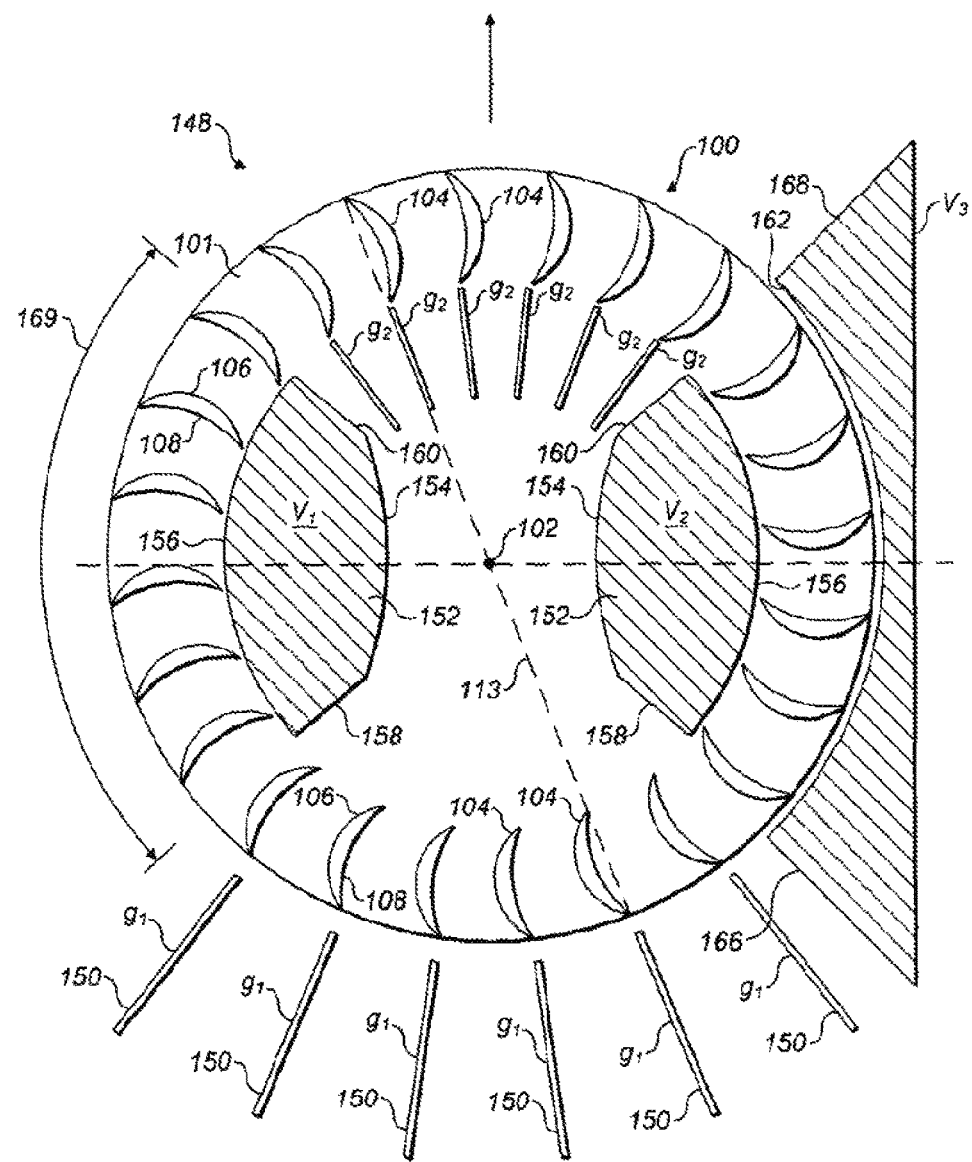
FIG. 3 is a plan view of a device to explain the present invention.

In the device of FIG. 3, which is outside of the scope of the invention as now claimed (where features the same as FIG. 1 are given like reference numerals), guides or fins 150 are used to guide fluid flow to increase the portion of the blades 104 of the device 148, which generate impulse in the desired direction (In this case, clockwise). Guards or shields 152 are used to reduce the portion of the blades 104 of the device which generate torque in the opposite, undesirable direction (in this case, anti-clockwise). In order to improve or optimise the angle of attack of the fluid flow onto the blades, typically the guides are located perpendicular to the instantaneous or linear direction of movement of the blades as they rotate or perpendicular to the circumference or edge of the disk to which the blades are connected. Shields are provided such that, at least in part, fluid is prevented from flowing over the portion of the blades that are orientated relative to the direction of fluid flow such that they produce a vectored force counter to the desired direction.

The use of guides or fins as shown in this embodiment is not preferred as will be apparent from the embodiments of FIGS. 6 and 6.

Shields 152 (Individually shown as $V_1$ and $V_2$ in FIG. 3) are fixed on either side of the axle 102. Their inside edges 154 are curved outwardly at both ends from the axle. This shape forms a Venturi channel through which fluid flows. The outside edges 156 of the shields $V_1$, and $V_2$ are curved inwardly, parallel to the outside circumference of the device. The space between the outside edges 156 of the shields 152 and the outside circumference is of a size to allow the blades 104 to move through. The windward side 158 of the shields $V_1$, and $V_2$ are sloped between their inside edges 152 and their outside edges 158 to direct the air flow into the Venturi channel. The leeward side 160 of the shields $V_1$, and $V_2$ are sloped between their inside edges 152 and their outside edges 158 to direct the air flow outwardly from the Venturi channel onto the leeward side blades. The Venturi channel drives the wind exiting the windward side blades onto the leeward side blades. The use of a Venturi channel as shown in this embodiment is not preferred as will be apparent from the embodiments of FIGS. 5 and 8.

Guides $g_1$ are located on the windward side of the turbine. They direct the fluid flow onto the blades on the windward side of the turbine. This provides the ideal angle of attack to maximise power from the blades on the windward side. The guides $g_1$ are thin, planar members or elongate fins whose longitudinal axes extend parallel to the axle. The guides $g_1$ are spaced apart along the circumference of the turbine. In the example of FIG. 3, there are six guides. That is, the number of guides corresponds to the number of blades that can fit between the shields $V_1$ and $V_2$ on the windward side.

Guides $g_2$ are located on the leeward side of the turbine between the shields $V_1$, and $V_2$ and the leeward side blades. They too direct the fluid flow onto the blades, but on the leeward side of the turbine. This provides the ideal angle of attack to maximise power from the blades on the leeward side. They too are thin, planar members or elongate fins whose longitudinal axes extend parallel to the axle. The guides $g_2$ are spaced apart circumferentially around the turbine. in the example of FIG. 3, there are six guides. That is, the number of guides corresponds to the number of blades that can fit between the shields $V_1$ and $V_2$ on the leeward side.

Shield $V_3$ guards against negative vectored forces that force the device in an undesirable anti-clockwise direction. Shield $V_3$ is fixed outwardly of the blades 104 that drive the turbine in an anti-clockwise direction. Its inner side 182 is curved around the outer circumference of the turbine. Channel 166 flares outwardly from the inner side 162 on the windward side. It directs the air flow onto the blades 104, which produce clockwise rotation. The portion 168 between the inner and outer side on the leeward side is sloped to allow the air to flow out from the blades 104.

This embodiment provides a driving force over 90° of the turbine on the windward side and over 90° on the leeward side, giving a total such driving force over 180° of the turbine. There is impetus provided by the fluid pressure acting against the flat side, lower side or camber 108 of the blades (FIGS. 2a and 2b) through the exposed quadrant 169 (FIG. 3) (the area extending radially outwardly from the outside edge of the shield $V_1$).

In this example, the device 148 is located on a rotatable mounting with a vane, in the manner of a weathercock, so that the device 148 is kept "head to wind", that is with guides $g_1$ on the windward side and guides $g_2$ on the leeward side.

Shield $V_1$, is optional. If shield $V_1$ is not present, the performance of the device is improved as the fluid flow pushes against the blades in quadrant 169, to further drive the turbine 100 around.

Figure 4:
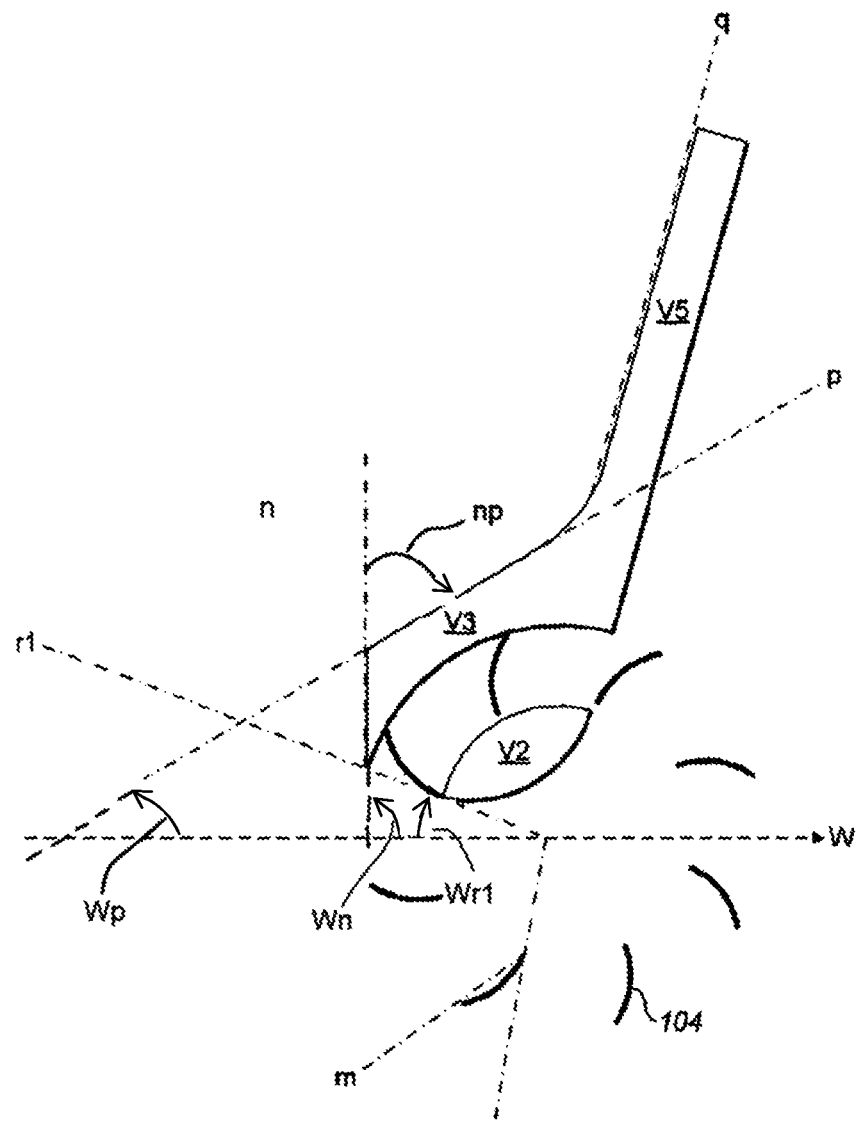
FIG. 4 is a schematic plan view of a turbine according to an embodiment of the invention.

FIG. 4 illustrates schematically in plan view the geometry of a wind turbine according to an of the invention. The rotor of the turbine comprises eight blades 104 distributed equally about its circumference. As in previous embodiments, the rotor blades 104 extend generally vertically between top and bottom discs, such that a space is formed in the interior of the rotor through which the wind can pass. In FIG. 4, the wind direction is illustrated schematically by the arrow W.

A portion of the rotor is protected from the wind by a shield V3. The rotor-facing (radially inward) surface of the shield V3 follows the circumference of the rotor with sufficient clearance for the rotor to rotate safely. The radially outward surface of the shield V3 is defined by lines r1, n, p and q. Line r1 is a radius of the circle which defines the rotor and marks the maximum extent of the shield V3 in the direction of rotation of the rotor (anti-clockwise in FIG. 4).

In this embodiment, the radius r1 is at an angle Wr1 ("the wind angle") of 15 degrees to the notional wind direction W in the contra-rotational direction of the rotor (clockwise in FIG. 4).

The windward surface of the shield V3 is defined by the line n, which in this embodiment is at an angle Wn of 90 degrees to the wind direction W in the rotational direction of the rotor. The outer surface of the shield V3 is further defined by line p, which in this embodiment is at an angle Wp of 30 degrees to the wind direction W in the rotational direction of the rotor. Thus, the angle np between the surface of the shield V3 defined by the line n and the surface of the shield defined by line p is 60 degrees in the contra-rotational direction of the rotor for the embodiment shown in FIG. 4.

If the angle Wn between the wind direction and the windward surface n of the shield V3 is increased, the front face of the shield V3 offers a more streamlined surface to the wind which guides air onto the rotor blades 104. However, it has been found desirable for the shield to generate a region of high pressure generally in the vicinity of the intersection of lines n and p which will encourage air to pass through the rotor rather than around the rotor.

The shield V3 comprises a tall portion V5 which extends away from the rotor in the direction of line q, which in this embodiment is parallel to a radius of the rotor, so that the tail V5 has a constant width. The tail portion V5 increases the resistance to wind flow around the shield V3 and therefore increases the high pressure region generated by the shield V3. In this embodiment, the angle pq between the outer surface of the shield V3 defined by line p and the outer surface of the tall portion V5 defined by line q is 45 degrees in the rotational direction.

Within the rotor, an internal shield V2 provides a streamlined path for wind through the rotor. The internal shield V2 is defined by an arc between the two radii that define the extent of the shield V3, V5 about the rotor. The radially outer arc of the internal shield V2 follows the circle defined by the radially inner edges of the blades 104, with sufficient clearance for safe rotation of the rotor. The radially inner surface of the internal shield V2 mirrors the profile of the outer surface along a chord line between the ends of the arc defining the outer surface.

In this embodiment, the rotor blades 104 are arcuate and follow a curve between a radially innermost point and a radially outermost point. The straight line joining the radially innermost point and a radially outermost point is illustrated as line m in FIG. 4. The angle dm between the radius of the circle defining the rotor and the line connecting the ends of the rotor blade is about 35 degrees an the contra-rotational direction of the rotor for the embodiment shown. This angle is important in that by tilting the rotor blades backward, i.e. in the contra-rotational direction (the opposite direction to the rotational direction), relative to the radial direction of the rotor, the leading surface of the rotor blade guides the air through the rotor before it emerges sufficiently from the shield V3 to catch the wind. This has been found to significantly enhance the power output of the turbine.

In the illustrated embodiment, the rotor has a diameter of 1.6 m. This is a prototype size and the full size rotor has a diameter of approximately 20 m. In the prototype, the thickness of the shield V3, for example, measured at the distal tip of the tail portion V5 is 21 cm and the length of the tall is approximately 2 m.

Figure 5:
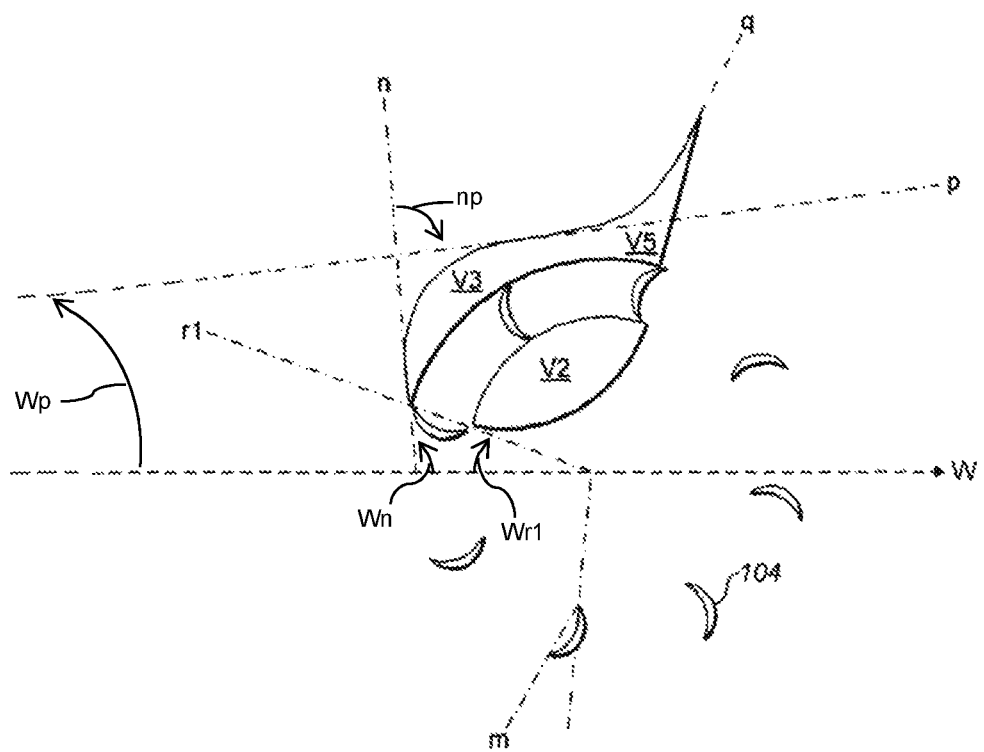
FIG. 5 is a schematic plan view of a turbine according to a further embodiment of the invention.

FIG. 5 illustrates schematically in plan view the geometry of a wind turbine according to a further embodiment of the invention. In this embodiment, the outer surface of the shield V3 has a more curved and less angular profile than the embodiment of FIG. 4. However, the geometry of the shield, in accordance with the invention, is similar.

In the embodiment of FIG. 5, the rotor of the turbine comprises eight blades 104 distributed equally about its circumference. As in previous embodiments, the rotor blades 104 extend generally vertically between top and bottom discs, such that a space is formed in the interior of the rotor through which the wind can pass.

In the embodiment of FIG. 5, the rotor-facing (radially inward) surface of the shield V3 follows the circumference of the rotor with sufficient clearance for the rotor to rotate safely. The radially outward surface of the shield V3 is defined by lines r1, n, p and q. Line r1 is a radius of the circle which defines the rotor and marks the maximum extent of the shield V3 in the direction of rotation of the rotor (anti-clockwise in FIG. 5). From the radius r1, the radially outward surface of the shield V3 forms a smooth curve, which curves firstly in the contra-rotational direction of the rotor (clockwise in FIG. 6) and then changes direction to curve in the rotational direction of the rotor (anti-clockwise in FIG. 5).

In this embodiment, the radius r1 is at an angle Wr1 ("the wind angle") of 15 degrees to the notional wind direction W in the contra-rotational direction of the rotor. The windward surface of the shield V3 is defined by the line n, which is the tangent to the curved surface where the surface meets the radius of the rotor r1 (ignoring any small scale smoothing at the tip of the shield V3). In this embodiment, line n is at an angle Wn of 95 degrees to the wind direction W in the rotational direction of the rotor.

The outer surface of the shield V3 is further defined by line p, which represents the maximum angular extent of the curved outer surface of the shield in the contra-rotational direction of the rotor, i.e. before the curve changes direction. In this embodiment, the angle np between the line n and the line p is 80 degrees in the contra-rotational direction of the rotor. Thus, the line p in this embodiment is at an angle Wp of 16 degrees to the wind direction W in the rotational direction of the rotor.

As in the previous embodiment, it has been found desirable for the configuration of the shield to be selected to generate a region of high pressure generally in the vicinity of the intersection of lines n and p which will encourage air to pass through the rotor rather than around the rotor.

The shield V3 comprises a tail portion V5 which extends away from the rotor in the direction of line q. The line q represents the maximum angular extent of the curved outer surface of the shield in the rotational direction of the rotor (anti-clockwise in FIG. 5) after the curve changes direction. In this embodiment, the angle pq between the outer surface of the shield V3 defined by line p and the outer surface of the tail portion V5 defined by line q is 55 degrees in the rotational direction.

Within the rotor, an internal shield V2 provides a streamlined path for wind through the rotor in the same way as in the embodiment of FIG. 4.

In the embodiment of FIG. 5, the rotor blades 104 are arcuate and follow a curve between a radially innermost point and a radially outermost point. The rotor blades 104 of this embodiment have a convex leading surface and a concave trailing surface. The straight line joining the radially innermost point and a radially outermost point is illustrated as line m in FIG. 6. The angle rim between the radius of the circle defining the rotor and the line connecting the ends of the rotor blade is 15 degrees in the contra-rotational direction of the rotor for the embodiment shown.

In the embodiment of FIG. 5, the rotor has a diameter of 1.6 m. This is a prototype size and the full size rotor has a diameter of approximately 20 m. In the prototype, the length of the tail is 0.6 m.

In summary, the principle of the device 100 is the use of a blade 104 which is arranged to rotate about a fixed axis with the blade's 104 principal or long axis parallel to the axis of rotation. The orientation of the axis of rotation is unimportant. However, for maximum efficiency it should be perpendicular to the normal flow of air. The air then flows across the device 100. The airflow is directed or guided across the diameter of the device across the centre of rotation. It then passes across another blade 104 on the other side. The air than flows out to free air. The action of the air passing across the blades 104 creates forces perpendicular to the principal axis of the blades 104 which are transmitted by means of a suitable structure (for example, a disk or wheel) to an axle 102, and power is obtained from the rotation of this axle 102.

In embodiments of the invention, the air is guided by the physical structure of a shield member and also by the high and low pressure regions that are formed by the interaction of the shield member and the rotor with the air.

The interior or inside of the rotor is shielded or has ducting such that the incoming air flow is directed across the diameter or centre and out across the blades at the optimum angle. As each blade is subjected to flow in two directions in one revolution of the rotor, the symmetric blade cross-section means that each blade provides power to the shaft when being subjected to the flow in both directions. The control of the fluid flow over the blades gives the optimum angle of attack for each blade.

In summary, a wind turbine for capturing energy from a fluid flow comprises a rotor having a rotational axis and a plurality of rotor blades 104 arranged for rotation about the rotational axis. The rotor blades extend longitudinally in a direction substantially parallel to the rotational axis. A shield member V3 is arranged to shield some of the rotor blades from an oncoming wind where incidence of the wind on those rotor blades would act against rotation of the rotor in the direction of rotation. The rotor blades 104 are distributed about the circumference of the rotor and are spaced from the rotational axis, defining a substantially cylindrical space within the rotor through which the wind passes. The shield member V3 is defined by a radially inward surface and a radially outward surface. The radially inward surface follows substantially a portion of the circumference of the rotor. The radially outward surface of the shield member V3 comprises a first portion which meets the radially inward surface. In the region of the interface with the radially inward surface, the first portion extends in a first direction n that makes an angle of at least 0 degrees and up to 90 degrees in the contra-rotational direction with the radial direction of the rotor. The radially outward surface of the shield member V3 comprises a second portion which meets the first portion. At least a portion of the second portion extends in a second direction p that makes an angle of more than 0 degrees in the contra-rotational direction with the first direction n. The turbine has improved power output and efficiency compared to earlier similar designs.

Embodiments of the present invention have been described with particular reference to the examples illustrated. However, it will be appreciated that variations and modifications may be made to the examples described within the scope of the present invention. Although the examples described above have largely been described in relation to the fluid flow being wind, the devices described herein could be used with other flowing fluids such as water flowing in rivers and tides. Although the devices of FIGS. 1 and 3 have been described having 24 blades around the circumference, different numbers of blades could be used.

The invention claimed is:

1. A turbine for capturing energy from an oncoming fluid flow, the turbine comprising:
   a rotor having a rotational axis and a plurality of rotor blades arranged for rotation about the rotational axis in a direction of rotation and extending longitudinally in a direction substantially parallel to the rotational axis;
   a shield member (V3) arranged to shield, in use, a plurality of the rotor blades at a windward side of the rotor from an oncoming fluid flow where incidence of the fluid on those rotor blades would act against rotation of the rotor in the direction of rotation,
   wherein the rotor blades are distributed about the circumference of the rotor and are spaced from the rotational axis, whereby to define a substantially cylindrical space within the rotor through which space the fluid flow passes, in use of the turbine;
   wherein the shield member is defined by a radially inward surface and a radially outward surface, the radially inward surface substantially following a portion of the circumference of the rotor;
   wherein the radially outward surface of the shield member comprises a first portion which meets the radially inward surface and in the region of the interface with the radially inward surface, the first portion extends in a first direction (n) that makes an angle of at least 0 degrees and up to 90 degrees with a radial direction (r1) of the rotor measured in the contra-rotational direction from the radial direction (r1) to the first direction (n);
   wherein the radially outward surface of the shield member comprises a second portion which meets the first portion and the angle between the first direction and a second direction (p) which follows at least a portion of the surface of the second portion is more than 0 degrees and less than 100 degrees measured in the contra-rotational direction from the first direction (n) to the second direction (p);
   wherein the radially outward surface of the shield member comprises a third portion which meets the second portion and at least a portion of the third portion extends in a third direction (q) that makes an angle of more than 30 degrees with the second direction (p) measured in the rotational direction from the second direction (p) to the third direction (q); and
   wherein the rotor is open on a side of the turbine opposite the shield member about an axis parallel to a direction of the oncoming fluid flow.

2. A turbine as claimed in claim 1, wherein said angle between the first direction (n) and the radial direction (r1) of the rotor is greater than 0 degrees and less than 90 degrees.

3. A turbine as claimed in claim 1, wherein the angle between the first direction (n) and the second direction (p) is greater than 40 degrees and less than 100 degrees.

4. A turbine as claimed in claim 1, wherein the angle between the second direction (p) and the third direction (q) is less than 90 degrees.

5. A turbine as claimed in claim 1, wherein the third portion has a length greater than half the radius of the rotor and less than three times the radius of the rotor.

6. A turbine as claimed in claim 1, wherein the rotor blades are arcuate in cross-section and a chord line (m) between the ends of the arcuate cross-section of the blades makes an angle of more than 0 degrees and less than 45 degrees in the contra-rotational direction with an outward radial direction of the rotor.

7. A turbine as claimed in claim 1 comprising more than five rotor blades and fewer than 19 rotor blades.

8. A turbine as claimed in claim 1, wherein the extent of the rotor blades in the radial direction of the rotor is greater than 10% of the radius of the rotor and less than 50% of the radius of the rotor.

9. A turbine as claimed in claim 1 further comprising a flow-directing member (V2) within the substantially cylindrical space.

10. A turbine as claimed in claim 9, wherein the flow-directing member has a radially outward surface which follows substantially a portion of the circumference of the substantially cylindrical space.

11. A turbine as claimed in claim 10, wherein the flow-directing member has a radially inward surface that substantially mirrors the radially outward surface.

* * * * *